(12) United States Patent
Lau

(10) Patent No.: US 7,073,287 B2
(45) Date of Patent: Jul. 11, 2006

(54) MOSQUITOES ERADICATING SYSTEM

(76) Inventor: Leung Fai Lau, 12 Pikake Crescent, Maple, Ontario (CA) L6A 3W3

( * ) Notice: Subject to any disclaimer, the term of this patent is extended or adjusted under 35 U.S.C. 154(b) by 78 days.

(21) Appl. No.: 10/938,702

(22) Filed: Sep. 13, 2004

(65) Prior Publication Data

US 2006/0053683 A1     Mar. 16, 2006

(51) Int. Cl.
*A01M 1/22* (2006.01)
*A01M 1/02* (2006.01)
*A01M 1/04* (2006.01)

(52) U.S. Cl. .............................. 43/112; 43/107; 43/113

(58) Field of Classification Search .......... 43/112–114, 43/139, 107
See application file for complete search history.

(56) References Cited

U.S. PATENT DOCUMENTS

| | | | | |
|---|---|---|---|---|
| 1,076,019 A * | 10/1913 | Clarke | ......................... | 43/112 |
| 1,590,439 A * | 6/1926 | LeBrecht | ..................... | 43/112 |
| 2,012,384 A * | 8/1935 | Gatti | ........................... | 43/112 |
| 2,038,495 A * | 4/1936 | Keller | .......................... | 43/112 |
| 2,715,295 A * | 8/1955 | Brown | ......................... | 43/107 |
| 3,201,893 A * | 8/1965 | Gesmar | ........................ | 43/113 |
| 3,513,585 A * | 5/1970 | Ross | ............................ | 43/113 |
| 4,037,351 A * | 7/1977 | Springer | ....................... | 43/112 |
| 4,332,100 A * | 6/1982 | Schneider | ..................... | 43/113 |
| 4,506,473 A * | 3/1985 | Waters, Jr. | .................... | 43/107 |
| 4,907,366 A * | 3/1990 | Balfour | ........................ | 43/114 |
| 4,914,854 A * | 4/1990 | Zhou et al. | .................... | 43/112 |
| 5,123,201 A * | 6/1992 | Reiter | .......................... | 43/107 |
| 5,167,090 A * | 12/1992 | Cody | ........................... | 43/139 |
| 5,205,064 A * | 4/1993 | Nolen | .......................... | 43/112 |
| 5,241,779 A * | 9/1993 | Lee | ............................. | 43/112 |
| 5,259,153 A * | 11/1993 | Olive et al. | .................... | 43/113 |
| 5,280,684 A * | 1/1994 | Filonczuk | ..................... | 43/112 |
| 5,311,696 A * | 5/1994 | Gauthier et al. | .............. | 43/113 |
| 5,311,697 A * | 5/1994 | Cavanaugh et al. | .......... | 43/113 |
| 5,347,748 A * | 9/1994 | Moreland et al. | ............. | 43/112 |
| 5,595,018 A * | 1/1997 | Wilbanks | ..................... | 43/112 |
| 5,632,115 A * | 5/1997 | Heitman | ....................... | 43/112 |
| 5,799,436 A * | 9/1998 | Nolen et al. | .................. | 43/112 |
| 6,032,406 A * | 3/2000 | Howse et al. | ................. | 43/112 |
| 6,055,766 A * | 5/2000 | Nolen et al. | .................. | 43/112 |
| 6,088,949 A * | 7/2000 | Nicosia et al. | ................ | 43/107 |
| 6,108,965 A * | 8/2000 | Burrows et al. | .............. | 43/113 |
| 6,134,826 A * | 10/2000 | Mah | ............................. | 43/112 |
| 6,305,122 B1 * | 10/2001 | Iwao et al. | ................... | 43/112 |
| 6,474,014 B1 * | 11/2002 | Yu | ............................... | 43/112 |
| 6,516,559 B1 * | 2/2003 | Simchoni et al. | ............. | 43/114 |

(Continued)

FOREIGN PATENT DOCUMENTS

AU      9511632 A  *  8/1995

(Continued)

*Primary Examiner*—Darren W. Ark
(74) *Attorney, Agent, or Firm*—David W. Wong

(57) ABSTRACT

A housing is provided for attracting and eradicating mosquitoes. The interior walls of the housing is painted with a dark color such as black and it is coupled to a water container with an air duct. An electrified conductive grid is mounted at a large front opening of the main housing. A mixture of water and charcoal is placed in the water container. A louver panel is mounted in front of the electrified conductive grid to provide a shield as well as a canopy against rain and sun light. An interior container having a plurality of open top compartment is located in the main housing with various selected organic materials placed in those compartments for creating an environment in the main housing attractive to various types of mosquitoes.

15 Claims, 4 Drawing Sheets

U.S. PATENT DOCUMENTS

| | | | |
|---|---|---|---|
| 6,530,172 B1 * | 3/2003 | Lenz | 43/112 |
| 6,568,124 B1 * | 5/2003 | Wilbanks | 43/112 |
| 6,591,545 B1 * | 7/2003 | Brunet | 43/112 |
| 6,618,984 B1 * | 9/2003 | Li | 43/112 |
| 6,665,979 B1 * | 12/2003 | Hsu | 43/112 |
| 6,718,685 B1 * | 4/2004 | Bossler | 43/113 |
| 6,718,687 B1 * | 4/2004 | Robison | 43/113 |
| 6,854,208 B1 * | 2/2005 | Chuang et al. | 43/113 |
| 6,874,273 B1 * | 4/2005 | Weisenburg, III | 43/112 |
| 6,920,716 B1 * | 7/2005 | Kollars et al. | 43/114 |
| 6,978,572 B1 * | 12/2005 | Bernklau et al. | 43/107 |
| 2003/0061757 A1 * | 4/2003 | Askin | 43/112 |
| 2005/0055870 A1 * | 3/2005 | Yelverton | 43/113 |
| 2005/0102888 A1 * | 5/2005 | Curnow et al. | 43/113 |
| 2005/0126068 A1 * | 6/2005 | Welch | 43/112 |
| 2005/0210735 A1 * | 9/2005 | Harmer et al. | 43/113 |

FOREIGN PATENT DOCUMENTS

| | | | | |
|---|---|---|---|---|
| AU | 9944477 A | * | 3/2000 | |
| DE | 10259651 A1 | * | 7/2004 | |
| FR | 2839854 A1 | * | 11/2003 | |
| GB | 1505294 A | * | 3/1978 | |
| JP | 6-46 A | * | 1/1994 | 43/107 |
| JP | 8-140549 A | * | 6/1996 | |
| JP | 8-154553 A | * | 6/1996 | |
| JP | 11-75657 A | * | 3/1999 | |
| JP | 2000-139318 A | * | 5/2000 | |
| JP | 2000-189030 A | * | 7/2000 | |
| JP | 2002-125563 A | * | 5/2002 | |
| JP | 2003-61541 A | * | 3/2003 | |
| WO | WO-00/59300 A1 | * | 10/2000 | |
| WO | WO-02/098218 A1 | * | 12/2002 | |
| WO | WO-2004/034783 A2 | * | 4/2004 | |
| WO | WO-2004/054358 A2 | * | 7/2004 | |

* cited by examiner

MOSQUITOES ERADICATING SYSTEM

FIELD OF THE INVENTION

This invention relates to an environmentally friendly system for eradicating flying insects and particularly for eradicating mosquitoes.

BACKGROUND OF THE INVENTION

Flying insects and particularly mosquitoes not only cause nuisance to humans but also animals. Mosquitoes bites cause itching and welts that can subsequently become infected, and mosquitoes may carry debilitating and fatal diseases such as malaria, encephalitis, West Nile virus, and HIV which can transmit to humans. Some fatal viruses are transmitted by mosquitoes from diseased birds or other mammals. A filarial parasite can be transmitted by mosquitoes to dogs to cause heart worm disease. The heart worm nematodes of such disease can lodge in the heart tissue of a dog to cause death if untreated.

There are numerous species of mosquitoes which commonly lay their eggs in water and the larvae will mature into adult mosquitoes in two to three days. Some species of mosquitoes will lay their eggs in damp soil, vegetation or other organic matters, or even salt marshes. The eggs can remain dormant until they are flooded and conditions are favorable for hatching into larvae which are carried by the flood water to lakes and rivers.

Adult mosquitoes prefer to live in calm, damp and shady or dark areas; and they become rather inactive in lighted areas or under the sun. Only female mosquitoes suck blood which they require for producing and laying eggs.

Numerous devices and methods have been developed for eradicating mosquitoes. Chemical pesticide sprays or smoke have been used for eliminating mosquitoes; however, the chemical substances in the pesticides may cause either short term or long term harmful medical side effects to humans and damages to the natural environment. Devices emitting bright light or gas have been used to attract mosquitoes and to destroy them; however, large number of such devices also inherently destroy all flying insects including beneficial insects such as bees, butterflies and moths. Some devices employ fire hazardous gas such as a mixture of carbon dioxide and propane to attract mosquitoes in order to annihilate them. Such devices are highly dangerous in use due to the potential fire hazard. Other devices require regular maintenance care or frequent replacement of component parts or replenishment of material used in them in order to operate. Some devices require household electrical supply to operate so that they must be located in close vicinity to an electrical outlet. Therefore, they are not suitable for outdoor use. All such known devices and methods are ineffective in eradicating mosquitoes. Chemical sprays or ointments for applying on the exposed skin of humans would deter mosquitoes from approaching the exposed skin to deliver bites but they do not eradicate the mosquitoes so that the mosquitoes will survive to find other unprotected victims.

SUMMARY OF THE INVENTION

It is the principal object of the present invention to provide a system for eradicating mosquitoes particularly female mosquitoes seeking a favorable environment for laying eggs.

It is another object of the present invention to provide a device which is operative in any indoor or outdoor location.

It is another object of the present invention to provide a device which is relatively maintenance-free.

It is yet another object of the present invention to provide a device which does not cause any pollution to the natural environment and is effective in operation of eradicating mosquitoes.

BRIEF DESCRIPTION OF THE DRAWINGS

Other objects will be in part apparent and in part pointed out hereinafter with reference to the accompanying drawings in which.

DETAILED DESCRIPTION OF THE PREFERRED EMBODIMENTS

Figure 1:
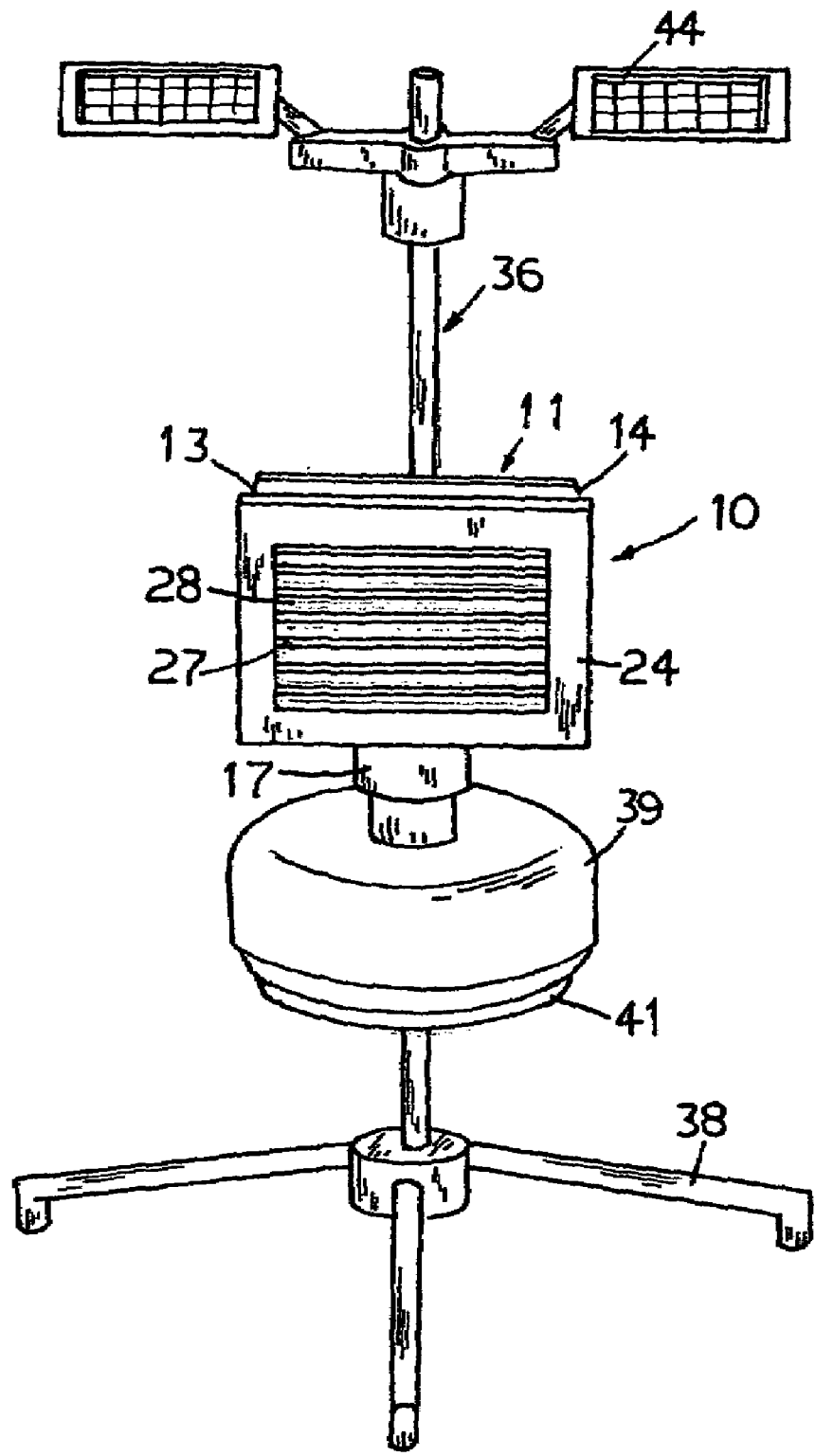
FIG. 1 is perspective front elevation view of the device according to the present invention.
Figure 2:
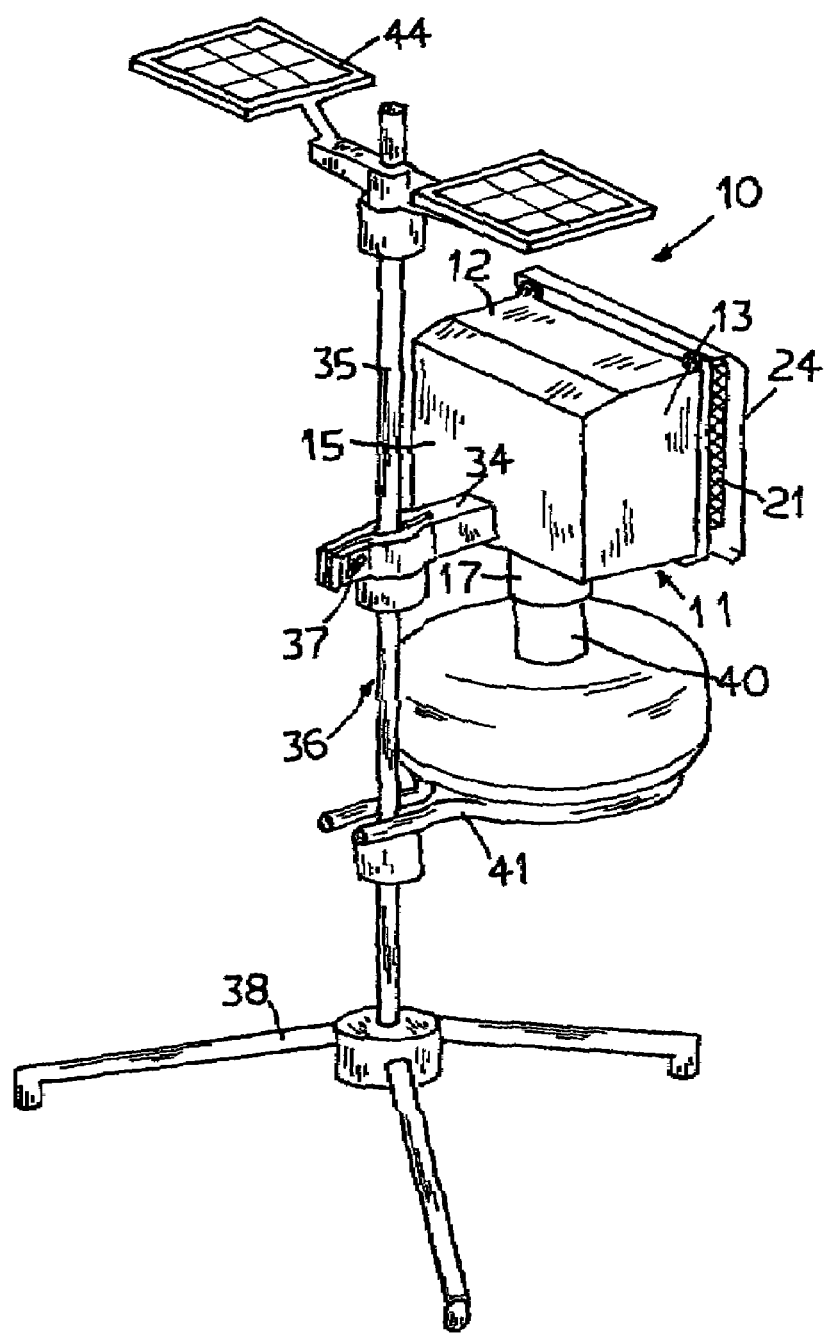
FIG. 2 is a side and rear elevation view of the device.

With reference to the drawings wherein like reference numerals designate corresponding parts in the several different views, the mosquitoes eradicating device 10 according to the present invention has a main housing 11 which is generally rectangular in shape having a top panel 12, a left side panel 13, a right side panel 14 and a rear panel 15. Either the left side panel 13 or the right side panel 14 may be removable to provide access to the interior 16 of the main housing 11. A lower duct 17 extends vertically downwards from the bottom panel 18. A large front opening 19 is located in the front of the main housing 11. The large opening 19 is surrounded by a front frame 20. The interior surface of all panels of the main housing 11 are preferably painted black or other subdued dark color in order to provide a shady-like environment in the interior 16 to form an alluring habitat for mosquitoes. An electrified conductive grid 21 is mounted on the front frame 20 and covering completely over the front opening 19. A protective mesh 22 having openings about 0.5 $mm^2$ is located behind the front opening 19 and is mounted on an inner extension frame 23 on the front frame 20 such that the protective mesh 22 is positioned in a spaced manner behind the electrified conductive grid 21. The protective mesh 22 prevents small insects from entering into the main housing 11 through the front opening 19. A louver panel 24 is provided in front of the electrified conductive grid 21. The louver panel 24 includes a top panel 25 having an L-shaped upper edge 26 for mounting the louver panel 24 to the main housing 11. The louver panel 24 has a plurality of horizontal slats 27 sloping outwardly and downwardly to prevent rain water from falling onto the electrified conductive grid 21 to cause it to malfunction. The transverse openings 28 between the horizontal slats 27 of the louver panel 24 have a small height of not more than 5 mm so as to prevent children from touching the electrified conductive grid 21 by accident and it also prevents relatively large harmless insects such as butterfly and dragonfly from coming in contact with the electrified conductive grid 21. The top panel 25 of the louver panel 24 also slopes downwardly and forwardly to provide a protective canopy over the electrified conductive grid 21. An interior container 29 is located in the main housing 11. The interior container 29 has a plurality of open top compartments 30 such that various selected organic materials may be placed in these separate compartments so as to enhance the enticement of the main housing 11 to mosquitoes. An electrical high speed fan 31 is mounted at the rear panel 15 in the interior of the main housing 11 and it is operated for a very short period of about 20 seconds in a pre-set interval for blowing the remains of the electrocuted mosquitoes which may adhere onto the electrified conductive grid 21 or other foreign matters such as spider webs from the louver openings 28. A long life LED light 32 is provided in the main housing 11. The LED light 32 will be turned on with an ambient light sensor to emit a low intensity violet light to attract mosquitoes to the device 10 in the night time. The operation of the LED light 32 and the high speed fan 31 are controlled by an electrical control circuit 33 mounted in the main housing 11.

A bifurcated mounting bracket 34 is provided at the outer surface of the rear panel 15 and it extends therefrom in a horizontal manner perpendicular to the rear panel 15. The main housing 11 may be mounted at a selected position of a vertical post 35 of a stand 36 with the bifurcated mounting bracket 34 and it is secured in place with a mounting bolt 37. The stand 36 has a plurality of divergent legs 38 for supporting the stand 36 with the main housing 11 mounted thereon to position securely on a supporting surface either indoors or outdoors. For outdoor application, the stand 36 may be in the form of an elongated post with a pointed lower end such that it may be inserted into the ground to provide a secure mounting for the device 10.

Figure 3:
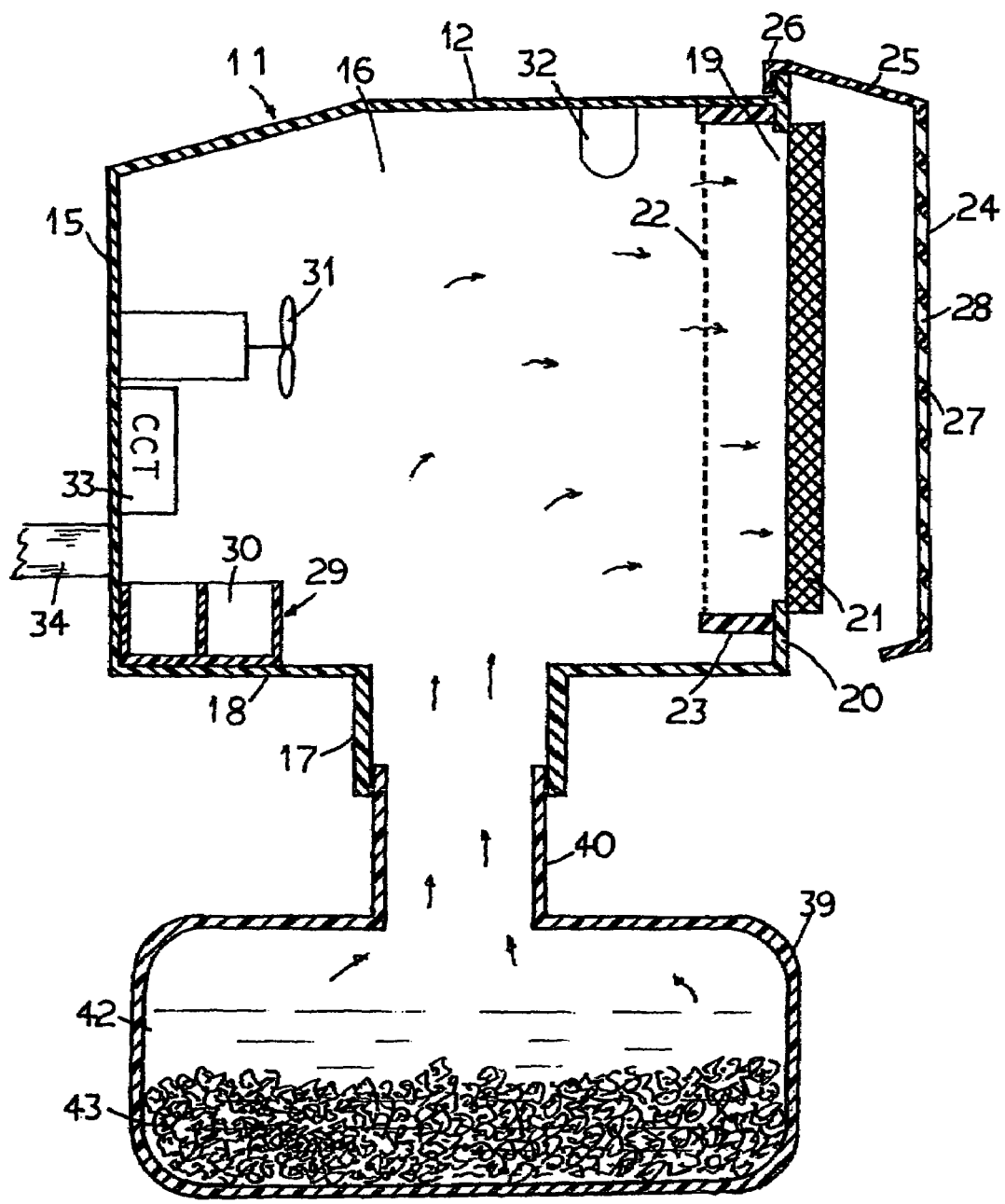
FIG. 3 is an enlarged partial sectional side elevation view of the main housing and water container of the device according to the present invention with some of the components shown in schematic form.
Figure 4:
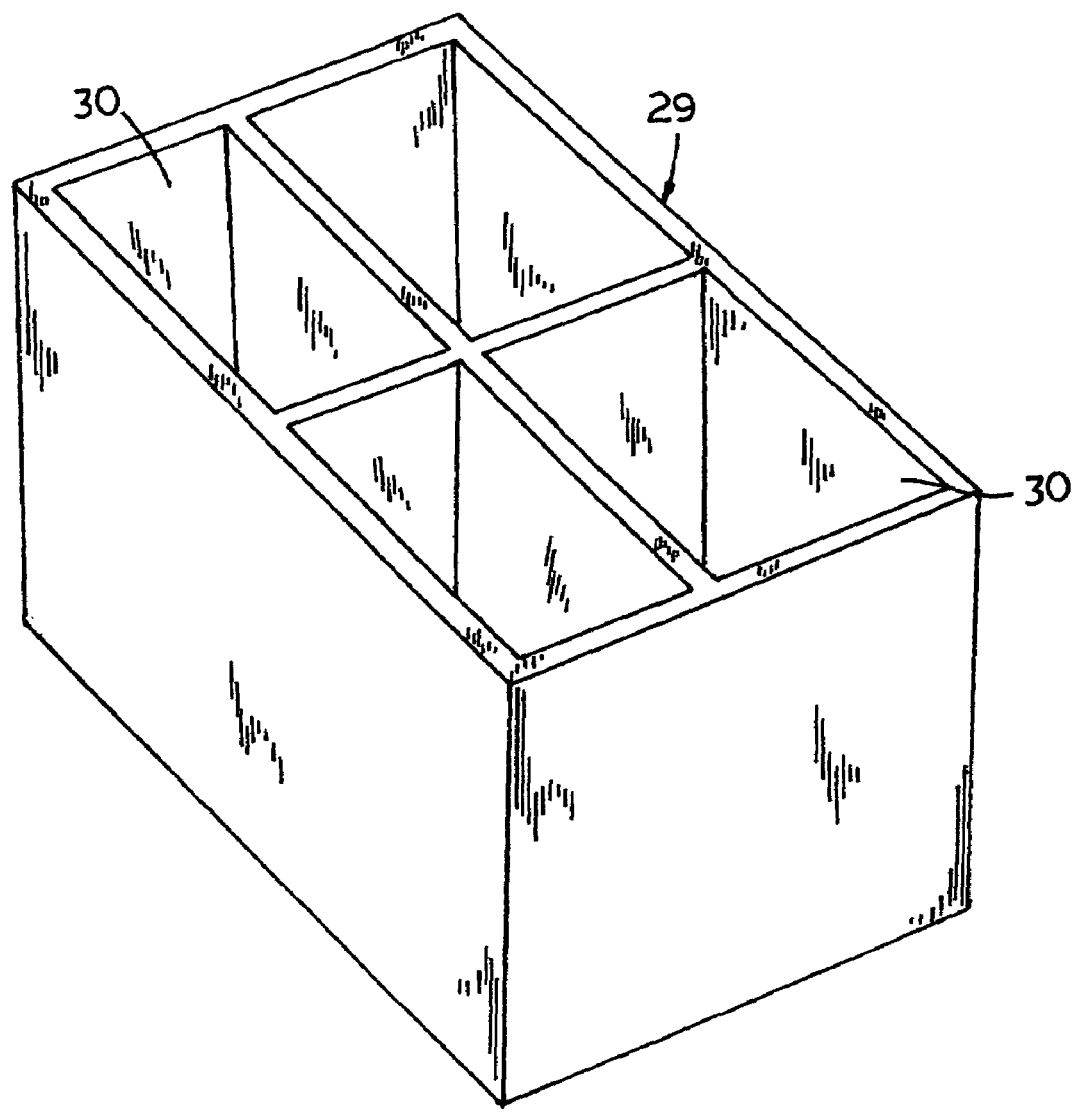
FIG. 4 is an enlarged perspective front and top view of the organic material interior container located in the main housing of the device according to the present invention.

A water container 39 having an open end upper duct 40 is located beneath the main housing 11 and it may be mounted on the stand 36 with a cantilever supporting bracket 41. The upper duct 40 is engageable with the lower duct 17 of the main housing 11 as best shown in FIG. 3 such that the interior of the main housing 11 and the water container 39 communicate with one another. A mixture of water 42 and charcoal 43 is placed in the water container 39. The mixture provides a mean to create humidity and a water source that is conducive to female mosquitoes to lay eggs. Alternatively, a mixture of water and other organic material such as wood, leaves, or soil may be used for the same purpose. The mixture of water and charcoal is preferred since it provides a long lasting mean which does not require subsequent regular maintenance or replacement.

The device 10 of the present invention may be used indoor by simply placing it directly on the floor with the water container 39 supporting the entire device. Supporting legs may also be provided at the bottom surface of the water container 39 for such purposes.

The electrical supply for operating the electrical components of the device may be provided by batteries or with solar cells 44 mounted on the top portion of the stand 36 when the device is to be located outdoors. Alternatively, the electrical power may be supplied by batteries or household electrical supply when the device is used indoor.

The moisture emitted from the water and charcoal mixture flow from the water container 39 into the main housing 11 to emit out of the front opening 19 through the electrified conductive grid 21. This moisture emitted from the device 10 as well as the humid and dark interior of the main housing 11 are particularly attractive to female mosquitoes seeking a water location and a humid environment to reside and to lay eggs. Thus, female mosquitoes will attempt to enter the main housing 11 resulting in being electrocuted by the electrified conductive grid 21. The device is also attractive to male mosquitoes seeking to mate with female mosquitoes which normally would be found in such environment of the main housing 11 and they would also attempt to enter the device 10 and thus would be electrocuted by the electrified conductive grid 21.

Various selective organic matters such as vegetation and soil may be placed in the various compartments 30 of the interior container 29 to further create an environment favorable for female mosquitoes seeking to lay eggs particularly in such organic matters in the natural environment. Salt may also be placed in the compartments 30 to create an environment in the main housing 11 to attract female mosquitoes seeking tr a salt marsh location to lay eggs.

Since all materials used for attracting the mosquitoes to the device 10 of the present invention are natural materials, thus it operates safely without causing any harmful pollution to the natural environment, or fire hazards or harmful health hazards to humans. It also operates completely maintenance free for a long period of time. Furthermore, it operates to eradicate mosquitoes without killing other beneficial insects.

The device 10 may be used for eradicating other pestilent flies or flying insects by placing materials attractive to the intended flies or flying insects in the interior container 29.

While the present invention has been shown and described in the preferred embodiments thereof, it will be apparent that various modifications can be made therein without departing from the spirit or essential attributes thereof, and it is desired therefore that only such limitations be placed thereon as are imposed by the appended claims.

What is claimed is:

1. A system for eradicating mosquitoes comprising,
   a main housing having inner side walls painted with a dark color and a large front opening,
   a lower air duet extending downwards from a bottom panel of said housing,
   an electrified conductive grid mounted on said housing and completely covering over said front opening,
   a water container having an upper air duct extending upwards therefrom and coupled with said lower air duct of said housing to join said water container and said housing together, and
   a mixture of water and an organic material disposed in said water container.

2. A system according to claim 1 including a louver panel mounted so as to be spaced manner in front of said electrified conductive grid, said louver panel having a plurality of horizontal spaced slats sloping forwardly and downwardly.

3. A system according to claim 2 including an interior container located within said main housing, said interior container having a plurality of open top compartments adapted for holding a selected amount of organic materials.

4. A system according to claim 3 wherein said organic materials are wood, vegetation, and soil.

5. A system according to claim 3 including an amount of salt disposed in said compartments.

6. A system according to claim 3 including a high speed electrically operated fan mounted on a rear panel of said main housing and operative fort predetermined periods for blowing dead mosquito remains from said electrified conductive grid and blocking matters from spaces between said horizontal slats of said louver panel.

7. A system according to claim 6 including a mesh mounted in said main housing and located so as to be spaced manner behind said electrified conductive grid adapted to prevent insects from entering into said main housing through said front opening.

8. A system according to claim 7 including a low intensity light emitting diode mounted in said main housing and operative to emit a low intensity of violet light.

9. A system for eradicating mosquitoes comprising,
a supporting stand,
a generally rectangular main housing having a large front opening, and inner walls painted with a dark color,
an electrified conductive grid mounted on said main housing and completely covering over said front opening,
a lower air duct extending downwardly from a bottom panel of said main housing, and a bifurcated mounting bracket extending in a horizontal manner rearwards from a rear panel of said housing and adapted for mounting said main housing at a selected height along an elongated vertical post of said supporting stand,
a water container mounted on said supporting stand, said water container having an upper air duct extending upwards therefrom and adapted to couple with said lower air duct of said main housing for joining said water container and said main housing together,
a mixture of water and an organic material located in said water container, and
a louver panel mounted on said main housing and located so as to be spaced mnner in front of said electrified conductive grid, said louver panel having a plurality of horizontal spaced slats extending forwardly and downwardly relative to said main housing, an and a top panel providing a canopy over said electrified conductive grid.

10. A system according to claim 9 including an interior container disposed in said main housing, said interior container having a plurality of open top compartments adapted for holding selected organic materials within said main housing.

11. A system according to claim 10 including a low intensity light emitting diode located in said main housing and adapted to emit a low intensity violet light at night time.

12. A system according to claim 11 including a high speed electric fan mounted on one of said inner walls formed by said a rear panel in of said main housing and operative for predetermined short time periods for blowing dead mosquito remains, on said electrified conductive grid and blocking matters forming in spaces between said horizontal slats of said louver panel.

13. A system according to claim 12 including an electrical control circuit mounted in said main housing and adapted to operate said electric fan and said light emitting diode with an electrical supply.

14. A system according to claim 13 including solar panels mounted at a top portion of said supporting stand and adapted to provide said electrical supply for operating said electrical control circuit, said electric fan, and said light emitting diode.

15. A system according to claim 14 wherein said mixture in said water container is water and charcoal.

* * * * *